(12) United States Patent
Fang et al.

(10) Patent No.: US 11,705,968 B2
(45) Date of Patent: Jul. 18, 2023

(54) ADJUSTMENT DEVICE AND ADJUSTING METHOD FOR STABILIZING OPTICAL CHARACTERISTIC PARAMETERS

(71) Applicant: Global Technology Inc., Ningbo (CN)

(72) Inventors: Likai Fang, Ningbo (CN); Jianliang Xu, Ningbo (CN); Zhiwei Yin, Ningbo (CN)

(73) Assignee: Global Technology Inc., Ningbo (CN)

( * ) Notice: Subject to any disclaimer, the term of this patent is extended or adjusted under 35 U.S.C. 154(b) by 8 days.

(21) Appl. No.: 17/238,754

(22) Filed: Apr. 23, 2021

(65) Prior Publication Data
US 2022/0303019 A1 Sep. 22, 2022

(30) Foreign Application Priority Data
Mar. 17, 2021 (CN) .......................... 202110284623.6

(51) Int. Cl.
*H04B 10/548* (2013.01)
*H04B 10/50* (2013.01)

(52) U.S. Cl.
CPC ......... *H04B 10/548* (2013.01); *H04B 10/501* (2013.01)

(58) Field of Classification Search
CPC ........................... H04B 10/548; H04B 10/501
USPC ...................................................... 398/188
See application file for complete search history.

(56) References Cited

U.S. PATENT DOCUMENTS

| 9,020,361 B2 * | 4/2015 | Kawakami ....... H04B 10/50575 398/198 |
| 10,917,172 B2 * | 2/2021 | Tomita ............. H04B 10/07955 |
| 2014/0168741 A1 * | 6/2014 | Li .......................... G02F 1/0123 359/239 |

(Continued)

FOREIGN PATENT DOCUMENTS

EP 2782270 A1 * 9/2014 ........... G02F 1/2255

OTHER PUBLICATIONS

Sun et al; bias-drift-free Mach-Zehnder modulators based on the heterogeneous silicon and lithium niobate platform; Dec. 2020; Photonics research vol. 8, No. 12; pp. 1-6. (Year: 2020).*

(Continued)

*Primary Examiner* — Amritbir K Sandhu
(74) *Attorney, Agent, or Firm* — Grossman Tucker Perreault & Pfleger, PLLC

(57) ABSTRACT

An adjusting method for stabilizing optical characteristic parameters applicable to transmitter optical subassemblies with silicon photonic chips is provided. The adjusting method might include: sensing an initial optical signal emitted by the transmitter optical subassembly with first control component, controlling phase setting parameter of the silicon photonic chip with the first control component to change the transmitter optical subassembly from emitting the initial optical signal to emitting a first modified optical signal, transmitting a power target value to second control component when the first modified optical signal conforms to the phase target value and sensing the first modified optical signal with the second control component, and controlling a bias current of the transmitter optical subassembly according to the first modified optical signal and the power target value to change the transmitter optical subas- (Continued)

sembly from emitting the first modified optical signal to emitting a second modified optical signal.

14 Claims, 6 Drawing Sheets

(56) References Cited

U.S. PATENT DOCUMENTS

| | | | |
|---|---|---|---|
| 2018/0088359 A1* | 3/2018 | Shirakawa | G02F 1/2257 |
| 2018/0267340 A1* | 9/2018 | Rohde | G02F 1/225 |
| 2018/0287711 A1* | 10/2018 | Fan | H04B 10/516 |
| 2018/0314127 A1* | 11/2018 | Fan | H04B 10/564 |
| 2022/0303019 A1* | 9/2022 | Fang | H04B 10/564 |

OTHER PUBLICATIONS

Sun et al.; Bias-drift-free MZMs based on a heterogeneous silicon and lithium niobate platform; Dec. 2020; photonics research vol. 8, No. 12; pp. 1-6. (Year: 2020).*

Sun et al; High-performance Bias-drift-free Modulators Based on Heterogeneous Silicon and Lithium Niobate Platform ; 2021; Optical Society of America; pp. 1-2. (Year: 2021).*

* cited by examiner

ADJUSTMENT DEVICE AND ADJUSTING METHOD FOR STABILIZING OPTICAL CHARACTERISTIC PARAMETERS

CROSS-REFERENCE TO RELATED APPLICATIONS

This non-provisional application claims priority under 35 U.S.C. § 119(a) on Patent Application No(s). 202110284623.6 filed in China, on Mar. 17, 2021, the entire contents of which are hereby incorporated by reference.

BACKGROUND

1. Technical Field

This disclosure relates to an adjustment device and method, and particularly to an adjustment device and method for stabilizing optical characteristic parameters applicable to a transmitter optical subassembly with silicon photonic chips.

2. Related Art

A silicon photonic chip is an integrated circuit made of silicon photonics materials and components through a special technique, and is mainly composed of a light source, a modulator and an active chip among others, all of which are usually integrated on the same silicon-based substrate. Because of using silicon as the substrate of the integrated chip, the silicon photonic chip is capable of integrating more photonic components, which helps realize higher integration level and is associated with the lowered cost. The cost of a photonic chip for a photonic module is very high, and as the required transmission rate increases, the cost of a wafer also increases. Accordingly, silicon-based materials with low cost prevail over other materials. Besides, because silicon photonic materials each have a larger band gap, higher reflection index and faster transmission, waveguides composed of the silicon photonic materials have great transmission performance.

The silicon photonic chip also has the characteristic of low power consumption, and is capable of decreasing the overall power consumption while being applied to a transmitter optical subassembly (TOSA) without thermoelectric cooler (TEC). An adjustment of the phase of optical signals is required for the silicon photonic chip. However, when the temperature of the environment in where the silicon photonic chip is located changes, the optical power of the optical signal generated by the silicon photonic chip would also change due to two reasons: (1) the temperature of the silicon photonic chip influences the phase of the optical signal generated by the silicon photonic chip and the phase of the optical signal generated by the silicon photonics chip influences the optical power of the optical signal generated by the silicon photonic chip; and (2) the optical power of the optical signal generated by the TOSA without TEC changes when the temperature of the environment in where the TOSA without TEC is located changes. The solution nowadays for solving the problem aforementioned is using the phase and bias current to create two searching table respectively, but it will take too much time to test each TOSA under different temperatures.

SUMMARY

Accordingly, this disclosure provides an adjustment device for stabilizing optical characteristic parameters, applicable to a transmitter optical subassembly with a silicon photonic chip. One embodiment of the disclosed adjustment device might include a first control component, which is connected to the transmitter optical subassembly and configured to receive an initial optical signal emitted by the transmitter optical subassembly and control a phase setting parameter of the silicon photonic chip according to a phase target value so as to change the transmitter optical subassembly from emitting the initial optical signal to emitting a first modified optical signal, a second control component, which is connected to the transmitter optical subassembly and configured to receive the first modified optical signal and control a bias current of the transmitter optical subassembly according to a power target value so as to change the transmitter optical subassembly from emitting the first modified optical signal to emitting a second modified optical signal, and a control unit, which is connected to the first control component and the second control component and configured to transmit the phase target value to the first control component, and transmit the power target value to the second control component when the first modified optical signal conforms to the phase target value.

Accordingly, this disclosure also provides an adjusting method for stabilizing optical characteristic parameters, applicable to the transmitter optical subassembly with the silicon photonic chip. One embodiment of the disclosed adjusting method might include by the first control component in the adjustment device sensing the initial optical signal emitted by the transmitter optical subassembly, by the first control component in the adjustment device controlling the phase setting parameter of the silicon photonic chip according to the initial optical signal and the phase target value transmitted from the control unit so as to change the transmitter optical subassembly from emitting the initial optical signal to emitting the first modified optical signal, by the control unit in the adjustment device transmitting a power target value to the second control component when the first modified optical signal conforms to the phase target value, and by the second control component in the adjustment device sensing the first modified optical signal and then controlling the bias current of the transmitter optical subassembly according to the first modified optical signal and the power target value so as to change the transmitter optical subassembly from emitting the first modified optical signal to emitting the second modified optical signal.

In view of the above description, the adjustment device and adjusting method for stabilizing optical characteristic parameters may adjust the transmitter optical subassembly to emit an optical signal whose temperature-sensitive phase and optical power conform to the phase target value and the power target value under different temperatures without installing additional temperature control component which increase the power consumption.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
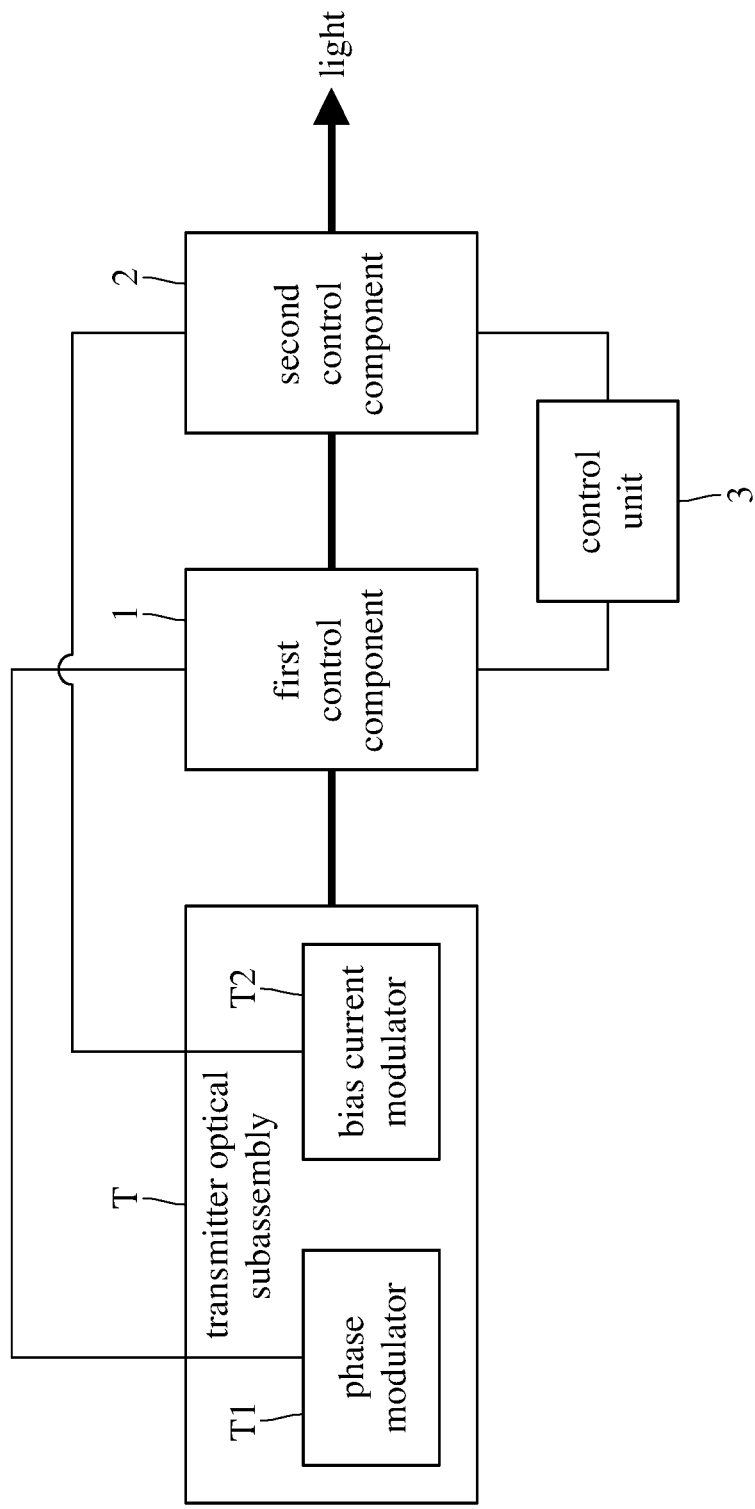
FIG. 1 is a block diagram of an adjustment device for stabilizing optical characteristic parameters according to an embodiment of the present invention.

Please refer to FIG. 1. An adjustment device for stabilizing optical characteristic parameters applicable to a transmitter optical sub-assembly (TOSA) T according to an embodiment of the present invention is disclosed. The transmitter optical sub-assembly T might include a silicon photonic chip having a phase modulator T1 and a bias current modulator T2 for respectively deciding the phase and power of the optical signal generated by the transmitter optical subassembly T. The adjustment device might include a first control component 1, a second control component 2 and a control unit 3. The first control component 1, connected to the transmitter optical subassembly T, is configured to receive the initial optical signal generated by the transmitter optical subassembly T and control the phase setting parameter of the silicon photonic chip according to a phase target value so as to change the transmitter optical subassembly T from emitting the initial optical signal to emitting the first modified optical signal. The second control component 2, connected to the transmitter optical subassembly T, is configured to receive the first modified optical signal and control the bias current of the transmitter optical subassembly T according to a power target value so as to change the transmitter optical subassembly T from emitting the first modified optical signal to emitting a second modified optical signal. The control unit 3, connected to the first control component 1 and the second control component 2, is configured to transmit the phase target value to the first control component 1, and transmit the power target value to the second control component 2 when the first modified optical signal conforms to the phase target value. As such, the transmitter optical subassembly T may emit the second modified optical signal that conforms to the requirements. That the first modified optical signal conforms to the phase target value may suggest that the phase value of the first modified optical signal is equal to the phase target value (that is, the phase difference is 0 between the phase value of the first modified optical signal and the phase target value) or that the phase value of the first modified optical signal falls within the range including the phase target value (for example, the aforementioned phase difference is less than a threshold). Accordingly, the phase value and the power value of the second modified optical signal may conform to the phase target value and the power target value, respectively. The first control component 1 and the second control component 2 are described in further detail with reference to FIGS. 2 and 3.

Figure 2:
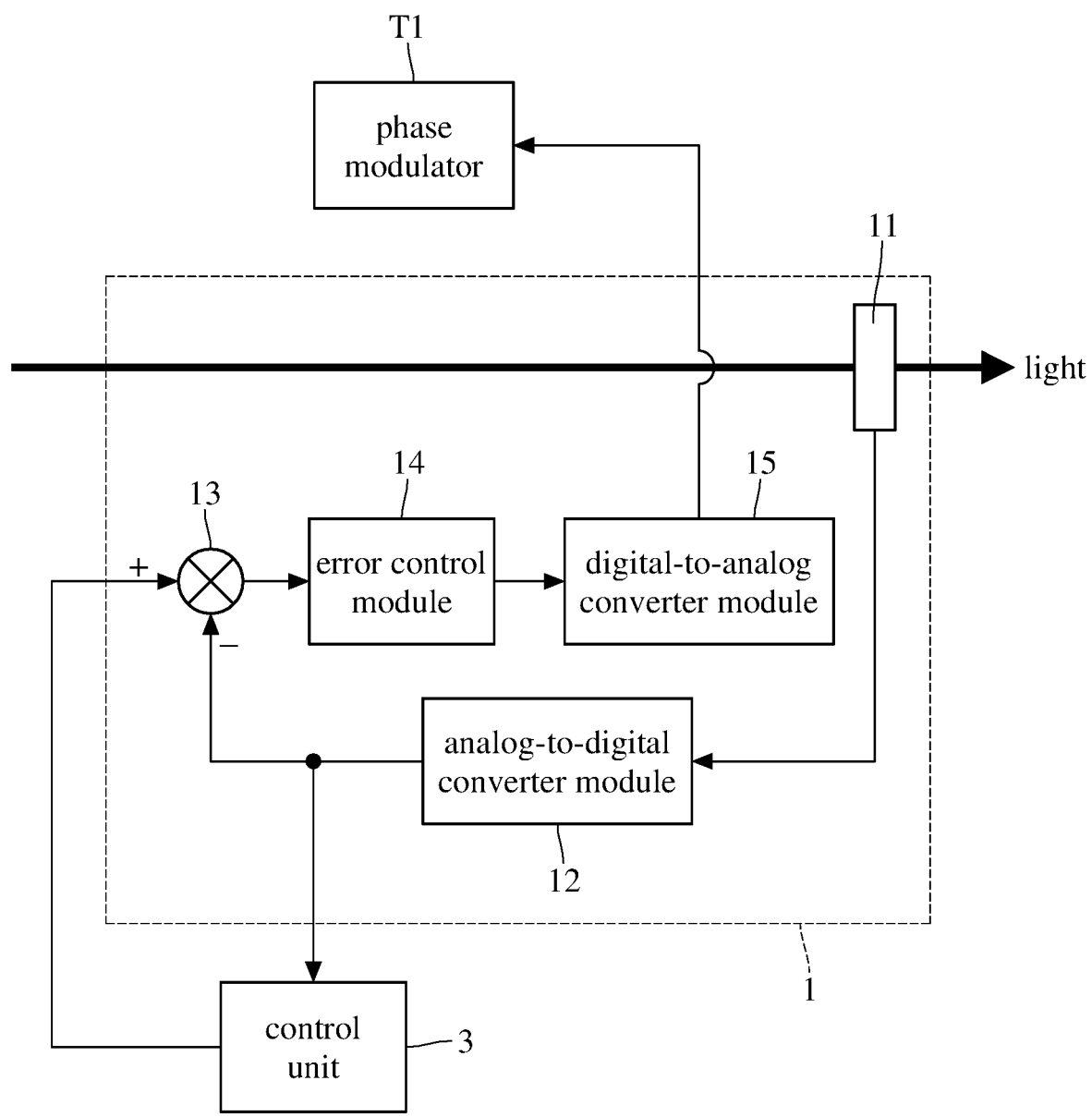
FIG. 2 is a schematic diagram of a first control component according to an embodiment of the present invention.

Please refer to FIG. 2, which is a schematic diagram of the first control component 1 according to an embodiment of the present invention. The first control component 1 may include: a sensing module 11, an analog-to-digital converter module 12, a difference module 13, an error control module 14 and a digital-to-analog converter module 15. When the combination of the difference module 13 and error control module 14 is implemented by a proportional integral derivative (PID) controller, the first control component 1 may control the error using PID control method so as to change the transmitter optical subassembly T from emitting the initial optical signal to emitting first modified optical signal with the phase thereof conforming to the phase target value. However, the implementation of the combination of the difference module 13 and error control module 14 abovementioned is not limited to the PID controller, and may be, for example, in terms of a controller with a machining learning architecture.

In detail, the sensing module 11 (e.g., an optical phase sensor) is configured to sense the phase data (e.g., the phase value) of the initial optical signal. The analog-to-digital converter module 12 (e.g., an analog-to-digital converter), connected to the sensing module 11, is configured to convert the form of the phase data into digital form. The difference module 13, connected to the control unit 3 (e.g., CPU, MCU or PLC) and the analog-to-digital converter module 12, is configured to receive the phase target value from the control unit 3 and the phase data from the analog-to-digital converter module 12, and output the difference between the phase target value and the phase data. The error control module 14, connected to the difference module 13, is configured to perform PID control calculations on the difference received from the difference module 13 to obtain a control value. In the PID control calculations, multiple parameters for proportional calculation, integral calculation and derivative calculation may be defined through experiments. The digital-to-analog converter module 15 (e.g., a digital-to-analog converter) generates a first adjusting signal according to the control value received from the error control module 14 and transmits the first adjusting signal to the phase modulator T1 of the transmitter optical subassembly T. The phase modulator T1 adjusts its phase setting parameter (such as the phase setting parameter of the silicon photonic chip abovementioned) according to the first adjusting signal so as to change the transmitter optical subassembly T from emitting the initial optical signal to emitting the first modified optical signal. Further, the control unit 3 may be connected to the output terminal of the analog-to-digital converter module 12 to receive the digital phase data for itself to determine whether the phase value of the initial optical signal conforms to the phase target value. When the phase value of the initial optical signal does not conform to the phase target value, the control unit 3 continues transmitting the phase target value to the difference module 13 of the first control component 1, allowing for the first control component 1 to continue the close-loop PID control. When the phase value of the initial optical signal conforms to the phase target value, which may be indicative of the conclusion of a first stage adjustment (such as the phase adjustment) and the commencement of a second stage adjustment (such as the optical power adjustment), the control unit 3 transmits the power target value to the second control component 2. In addition, the control unit 3 may not be connected to the analog-to-digital converter module 12. Instead, the control unit 3 may be connected to the output terminal of the difference module 13 to obtain the difference aforementioned or the output terminal of the error control module 14 to obtain the control value aforementioned, so that the control unit 3 may directly determine whether the first stage adjustment is completed, and when the difference or the control value is less than a threshold, the control unit 3 then determines the first stage adjustment is completed.

Figure 3:
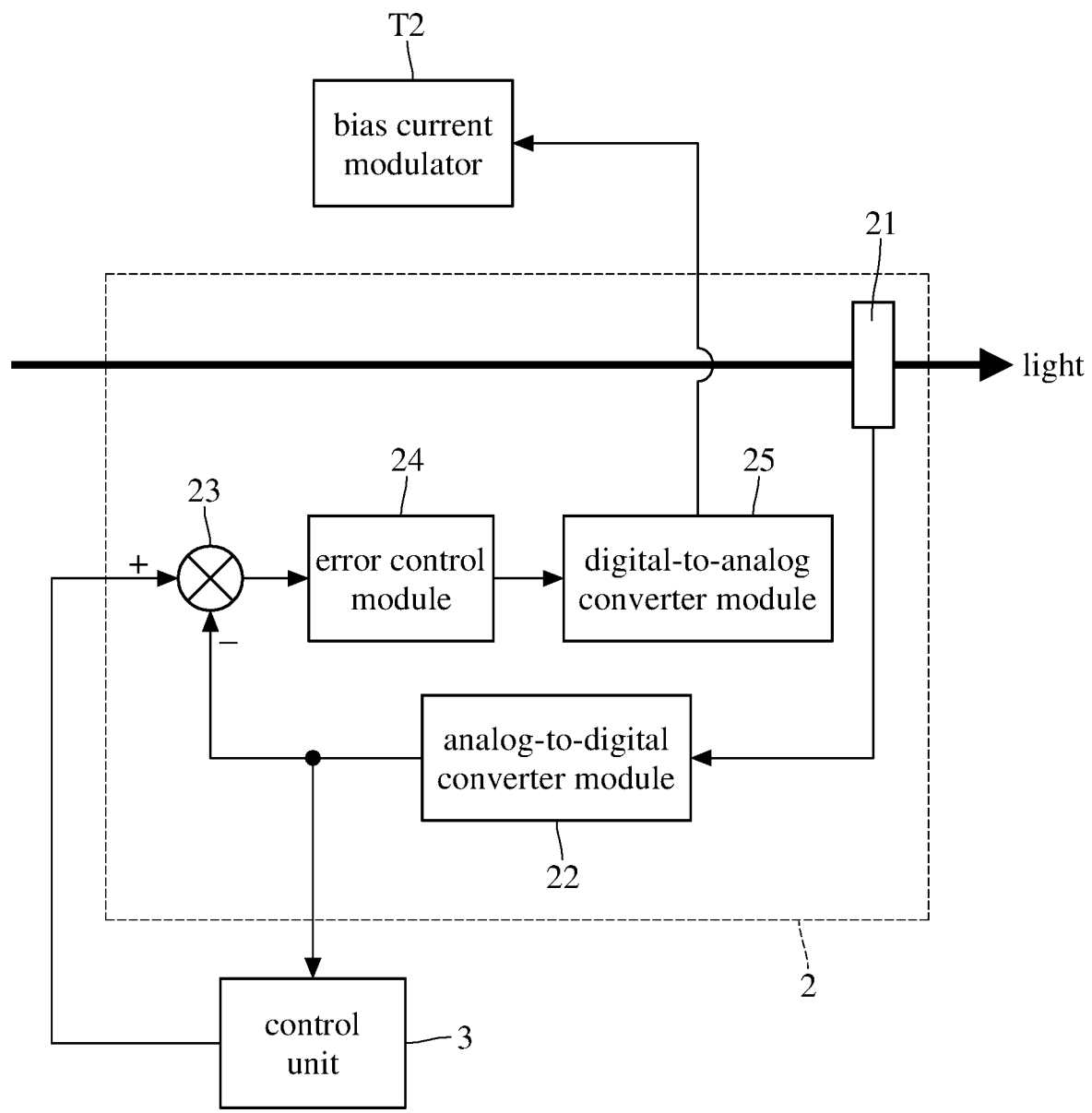
FIG. 3 is a schematic diagram of a second control component according to an embodiment of the present invention.

Please refer to FIG. 3, which is a schematic diagram of the second control component 2 according to an embodiment of the present invention. The second control component may include a sensing module 21, an analog-to-digital converter module 22, a difference module 23, an error control module 24 and a digital-to-analog converter module 25. The elements of the second control component 2 might roughly be the same as the elements 11-15 in the first control component 1 with at least one difference being the sensing module 21 (e.g., an optical power sensor) configured to sense the power data (e.g., a power value), the analog-to-digital converter module 22 converting the form of the power data into digital form, the difference module 23 configured to receive the power target value, and the digital-to-analog converter module 25 configured to generate the second adjusting signal and transmit it to the bias current modulator T2 of the transmitter optical subassembly T. According to the second adjusting signal received from the digital-to-analog converter module 25, the bias current modulator T2 controls the bias current of the transmitter optical subassembly T so as to change the transmitter optical subassembly T from emitting the first modified optical signal to emitting the second modified optical signal. In summary, the transmitter optical subassembly T may switch from emitting the initial optical signal to emitting the first modified optical signal after the phase adjustment performed by the first control component 1, and may further switch to emitting the second modified optical signal after the power adjustment performed by the second control component 2. It is worth noting that the phase value and the power value of the second modified optical signal may conform to the phase target value and the power target value, respectively.

Figure 4:
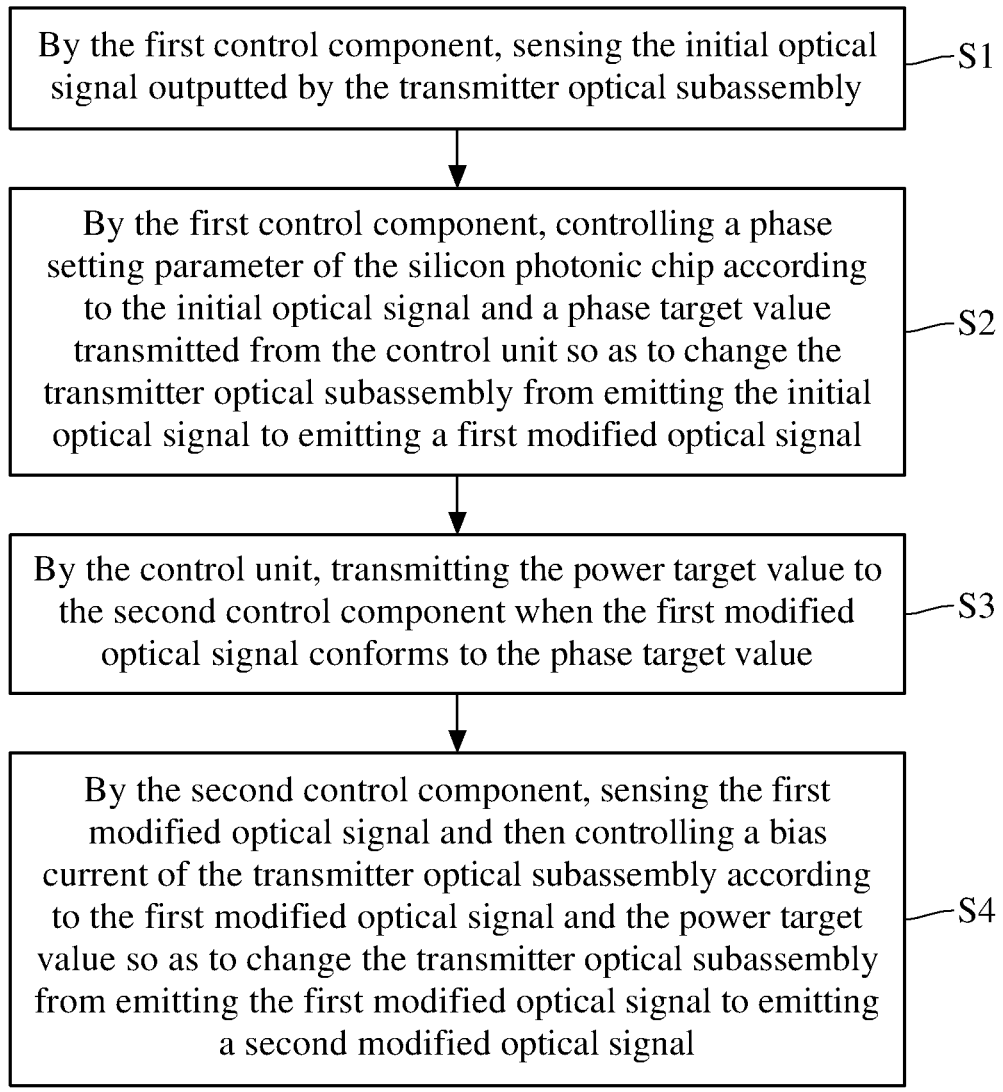
FIG. 4 is a flowchart of a method for adjusting stable light characteristic parameters according to an embodiment of the present invention.

Please refer to FIG. 4. An embodiment of an adjusting method for stabilizing optical characteristic parameters, applicable to the transmitter optical subassembly T with a silicon photonic chip of the present invention is also provided. The adjusting method may be used in the operation of the adjustment device in the present disclosure. The adjusting method may include following steps S1-S4. In step S1, the adjusting method, by the first control component 1, may be sensing the initial optical signal outputted by the transmitter optical subassembly T. The transmitter optical subassembly T outputs the initial optical signal, and the sensing module 11 of the first control component 1 receives the initial optical signal and senses its phase data.

Figure 5:
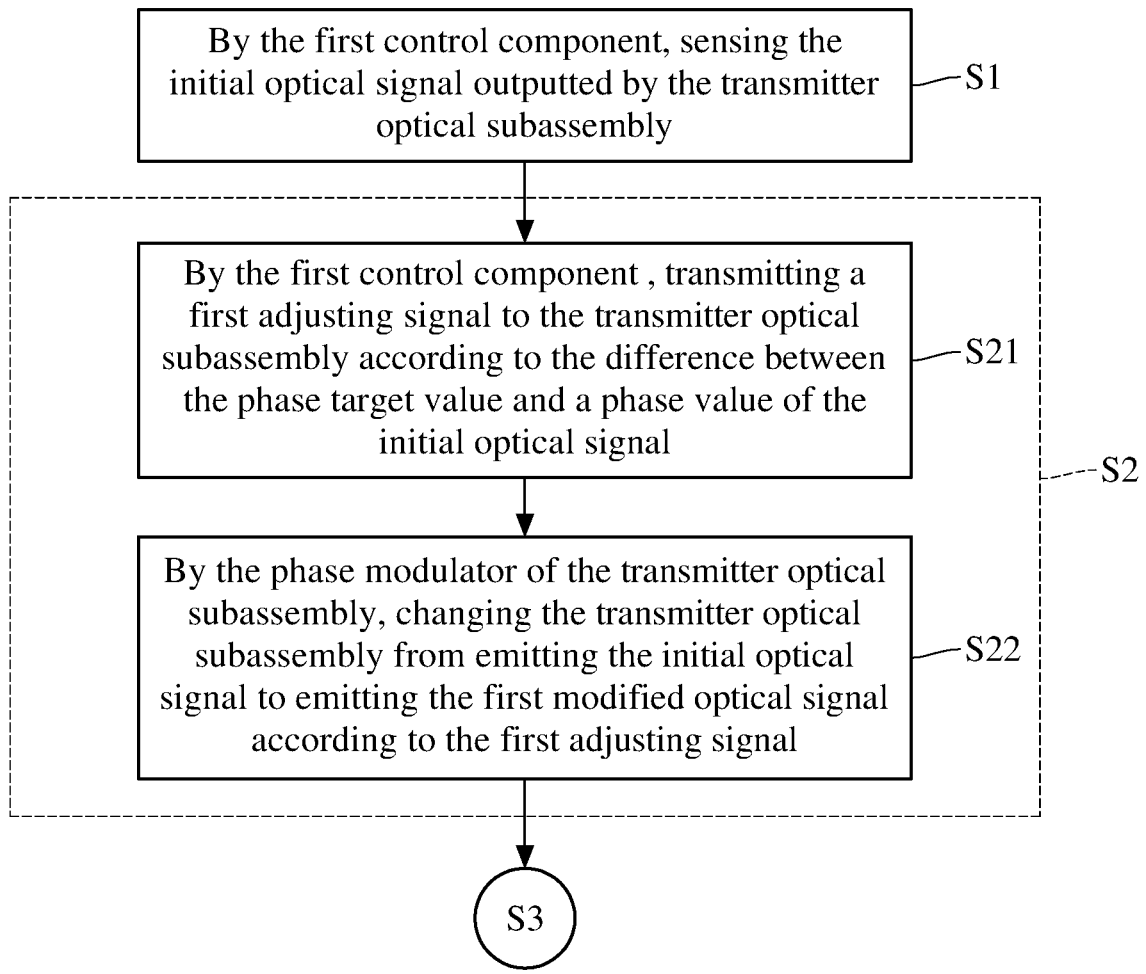
FIG. 5 is a partial flowchart of a method for adjusting stable light characteristic parameters according to an embodiment of the present invention.
Figure 6:
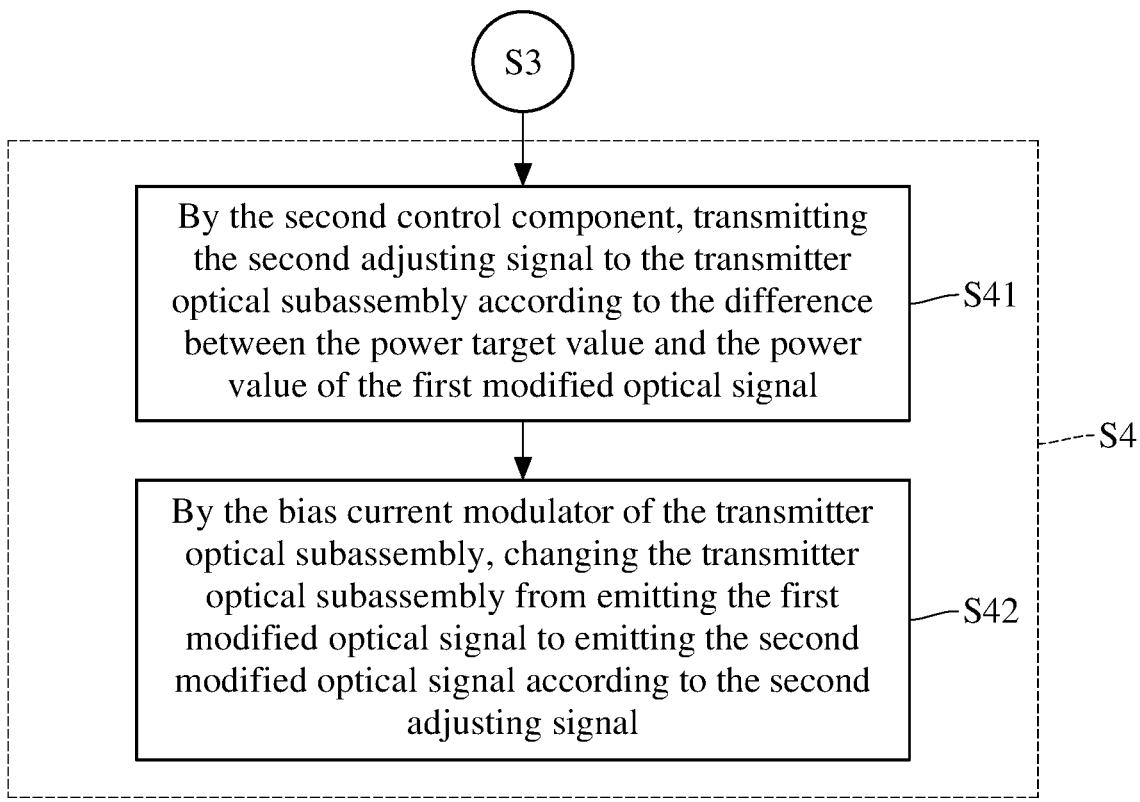
FIG. 6 is a partial flowchart of a method for adjusting stable light characteristic parameters according to an embodiment of the present invention.

In step S2, the adjusting method by the first control component 1 in the adjustment device may be controlling a phase setting parameter of the silicon photonic chip according to the initial optical signal and a phase target value transmitted from the control unit 3 so as to change the transmitter optical subassembly T from emitting the initial optical signal to emitting a first modified optical signal. In practice, as shown in FIG. 5, step S2 may include two sub-steps S21 an S22. In step S21, the adjusting method by the first control component 1 in the adjustment device may be transmitting a first adjusting signal to the transmitter optical subassembly T according to the difference between the phase target value and a phase value of the initial optical signal. After the sensing module 11 receives the phase data of the initial optical signal, the analog-to-digital converter module 12 converts the form of the phase data into digital form. Then, the difference module 13 obtains a difference by subtracting the phase target value transmitted by the control unit 3 and the phase data (phase value as abovementioned), and the error control module 14 obtains a control value by executing the PID control calculation on the difference received from the difference module 13. Finally, the digital-to-analog converter module 15 generates the first adjusting signal and transmits it to the phase modulator T1 of the transmitter optical subassembly T according to the control value received from the error control module 14. In step S22, the adjusting method by the phase modulator T1 of the transmitter optical subassembly T may be changing the transmitter optical subassembly T from emitting the initial optical signal to emitting the first modified optical signal according to the first adjusting signal. More particularly, the phase modulator T1 adjusts the phase setting parameter according to the first adjusting signal, and then, the transmitter optical subassembly T generates and emits the first modified optical signal. The phase value of the first modified optical signal depends on the adjusted phase setting parameter.

In step S3, the adjusting method by the control unit 3 may be transmitting the power target value to the second control component 2 when the first modified optical signal conforms to the phase target value. In practice, in an embodiment of the present invention, whether the first modified optical signal conforms to the phase target value is determined by the control unit 3. For example, the first control component 1 may transmit the first modified optical signal to the control unit 3 and the control unit 3 may determine whether a phase value of the first modified optical signal conforms to the phase target value in every predetermined phase detection period. In one implementation, the phase detection period may be, for example, 2 milliseconds. The phase detection period may be regarded as the minimum time unit for the control unit 3 to monitor the status of the phase adjustment, or regarded as the minimum time unit for the operating time interval of the first control component 1. The control unit 3 transmits the power target value to the second control component 2 when the phase value of the first modified optical signal conforms to the phase target value. When the phase value of the first modified optical signal does not conform to the phase target value, the control unit 3 continues transmitting the phase target value to the first control component 1 and the first control component 1 continues adjusting the phase setting parameter of the silicon photonic chip so long as the difference is still not equal to 0 or not less than the threshold until the phase value of the first modified optical signal conforms to the phase target value.

In step S4, the adjusting method by the second control component 2 might be sensing the first modified optical signal and then controlling a bias current of the transmitter optical subassembly T according to the first modified optical signal and the power target value so as to change the transmitter optical subassembly T from emitting the first modified optical signal to emitting a second modified optical signal. In practice, after the second control component 2 receives the power target value, the difference module 23 can generate the difference, and the second control component 2 can perform the PID control calculation. Step S4 might further include two sub-steps S41 and S42. In step S41, the adjusting method by the second control component 2 might be transmitting the second adjusting signal to the transmitter optical subassembly T according to the difference between the power target value and the power value of the first modified optical signal. In step S42, the adjusting method might be further by the bias current modulator T2 of the transmitter optical subassembly T changing the transmitter optical subassembly T from emitting the first modified optical signal to emitting the second modified optical signal according to the second adjusting signal. More particularly, the bias current modulator T2 adjusts the bias current according to the second adjusting signal, before the transmitter optical subassembly T generates and emits the second modified optical signal. In short, the power of the second modified optical signal might be considered dependent on the adjusted bias current. The PID control calculation process of step S41 is similar to that of step S21, and step S42 is similar to step S22. A person having ordinary skill in the art of the present invention can learn about its operation after referring to this specification, so it will not be repeated here.

Besides, the control unit 3 may determine whether the power value of the second modified optical signal conforms to the power target value in every predetermined power detection period. The power detection period may be longer than the phase detection period and may be, for example, 10 ms. The power detection period may be regarded as the minimum time unit for the control unit 3 to monitor the status of the power adjustment, or be regarded as the minimum time unit for the operating time interval of the second control component 2. When the power value of the second modified optical signal conforms to the power target value, the second control component 2 maintains the bias current of the transmitter optical subassembly T. When the power value of the second modified optical signal does not conform to the power target value, the control unit 3 continues transmitting the power target value to the second control component 2 and the second control component 2 continues adjusting the bias current of the bias current modulator T2 of the transmitter optical subassembly T, so long as the difference is not equal to 0 or less than a threshold.

In view of the above description, according to the adjustment device and adjusting method for stabilizing optical characteristic parameters of the present invention, after the transmitter optical subassembly T emits the initial optical signal, the first control component 1 receives the initial optical signal and controls the phase setting parameter of the silicon photonic chip according to the phase target value so as to change the transmitter optical subassembly T from emitting the initial optical signal to emitting the first modified optical signal. Additionally, the second control component 2 after receiving the first modified optical signal might control the bias current of the transmitter optical subassembly T according to the power target value so as to change the transmitter optical subassembly T from emitting the first modified optical signal to emitting the second modified optical signal. Also, the phase value and the power value of the second modified optical signal may end up conforming to the phase target value and the power target value, respectively.

With the adjustment device and adjusting method for stabilizing optical characteristic parameters, the present invention may adjust the transmitter optical subassembly to emit an optical signal whose temperature-sensitive phase and optical power could be satisfying the phase target value and the power target value under different temperatures without installing additional temperature control components, which simply would increase the overall power consumption.

What is claimed is:

1. An adjustment device for stabilizing optical characteristic parameters applicable to a transmitter optical subassembly with a silicon photonic chip, comprising:
    a first control component, connected to the transmitter optical subassembly, configured to receive an initial optical signal emitted by the transmitter optical subassembly and control a phase setting parameter of the silicon photonic chip according to a phase target value so as to change the transmitter optical subassembly from emitting the initial optical signal to emitting a first modified optical signal;
    a second control component, connected to the transmitter optical subassembly, configured to receive the first modified optical signal and control a bias current of the transmitter optical subassembly according to a power target value so as to change the transmitter optical subassembly from emitting the first modified optical signal to emitting a second modified optical signal; and
    a control unit, connected to the first control component and the second control component, configured to transmit the phase target value to the first control component, and transmit the power target value to the second control component when the first modified optical signal conforms to the phase target value, wherein the control unit is configured to determine whether the phase value of the first modified optical signal conforms to the phase target value in a predetermined phase detection period and is configured to determine whether the second modified optical signal conforms to the power target value in a predetermined power detection period, wherein the phase detection period is less than the power detection period.

2. The adjustment device for stabilizing the optical characteristic parameters according to claim 1, wherein the silicon photonic chip comprises a phase modulator, and the first control component is electrically connected to the phase modulator for transmitting a first adjusting signal, so that the transmitter optical subassembly outputs the first modified optical signal.

3. The adjustment device for stabilizing the optical characteristic parameters according to claim 1, wherein the second control component, electrically connected to a bias current modulator of the transmitter optical subassembly, is configured to transmit a second adjusting signal, so that the transmitter optical subassembly outputs the second modified optical signal.

4. The adjustment device for stabilizing the optical characteristic parameters according to claim 1, wherein the first control component comprises a phase sensor.

5. The adjustment device for stabilizing the optical characteristic parameters according to claim 4, wherein the first control component further comprises an analog-to-digital converter, a digital-to-analog converter, and a proportional integral derivative (PID) controller.

6. The adjustment device for stabilizing the optical characteristic parameters according to claim 1, wherein the second control component comprises an optical power sensor.

7. The adjustment device for stabilizing the optical characteristic parameters according to claim 6, wherein the second control component further comprises an analog-to-digital converter, a digital-to-analog converter, and a proportional integral derivative (PID) controller.

8. The adjustment device for stabilizing the optical characteristic parameters according to claim 1, wherein the control unit is selected from the group consisting of a CPU, MCU and PLC.

9. An adjusting method for stabilizing optical characteristic parameters applicable to a transmitter optical subassembly with a silicon photonic chip, comprising:
    sensing an initial optical signal emitted by the transmitter optical subassembly;
    controlling a phase setting parameter of the silicon photonic chip according to the initial optical signal and a phase target value transmitted from a control unit so as to change the transmitter optical subassembly from emitting the initial optical signal to emitting a first modified optical signal, wherein the control unit determines whether a phase value of the first modified optical signal conforms to the phase target value in a predetermined phase detection period; and sensing the first modified optical signal and then controlling a bias current of the transmitter optical subassembly according to the first modified optical signal and a power target value transmitted from the control unit when the first modified optical signal conforms to the phase target value so as to change the transmitter optical subassembly from emitting the first modified optical signal to emitting a second modified optical signal, wherein the control unit determines whether the second modified optical signal conforms to the power target value in a predetermined power detection period, wherein the phase detection period is less than the power detection period.

10. The adjusting method for stabilizing the optical characteristic parameters according to claim 9, wherein the silicon photonic chip comprises a phase modulator, and controlling the phase setting parameter of the silicon photonic chip according to the initial optical signal and the phase target value so as to change the transmitter optical subassembly from emitting the initial optical signal to emitting the first modified optical signal comprises:

transmitting a first adjusting signal to the transmitter optical subassembly according to a phase difference between the phase target value and a phase value of the initial optical signal; and changing the transmitter optical subassembly from emitting the initial optical signal to emitting the first modified optical signal according to the first adjusting signal.

11. The adjusting method for stabilizing the optical characteristic parameters according to claim 9, wherein sensing the initial optical signal and controlling the phase setting parameter is performed by a first control component, wherein the power target value is transmitted by a control unit to a second control component, and wherein transmitting the power target value to the second control component further comprises:

transmitting, when the first modified optical signal conforms to the phase target value, the power target value to the second control component by the control unit; and when the first modified optical signal does not conform to the phase target value, continuing adjusting the phase setting parameter of the silicon photonic chip by the first control component until the first modified optical signal conforms to the phase target value.

12. The adjusting method for stabilizing the optical characteristic parameters according to claim 11, after the transmitter optical subassembly is changed from emitting the first modified optical signal to emitting the second modified optical signal further comprising:

maintaining, by the second control component, the bias current of the transmitter optical subassembly when a power value of the second modified optical signal conforms to the power target value; and continuing, by the second control component, adjusting the bias current of the transmitter optical subassembly when the second modified optical signal does not conform the power target value.

13. The adjusting method for stabilizing the optical characteristic parameters according to claim 9, wherein sensing the first modified optical signal and then controlling the bias current of the transmitter optical subassembly according to the first modified optical signal and the power target value so as to change the transmitter optical subassembly from emitting the first modified optical signal to emitting a second modified optical signal further comprises:

transmitting a second adjusting signal to the transmitter optical subassembly according to a power difference between the power target value and a power value of the first modified optical signal; and changing the transmitter optical subassembly from emitting the first modified optical signal to emitting the first modified optical signal according to the second adjusting signal.

14. The adjusting method for stabilizing the optical characteristic parameters according to claim 9, after the transmitter optical subassembly changes the transmitter optical subassembly from emitting the first modified optical signal to emitting the second modified optical signal, further comprising:

maintaining the bias current of the transmitter optical subassembly when a power value of the second modified optical signal conforms to the power target value; and continuing adjusting the bias current of the transmitter optical subassembly when the second modified optical signal does not conform to the power target value.

* * * * *